United States Patent [19]

Pravda

[11] 4,222,436
[45] Sep. 16, 1980

[54] HEAT EXCHANGE APPARATUS

[75] Inventor: Milton F. Pravda, Baltimore, Md.

[73] Assignee: Dynatherm Corporation, Cockeysville, Md.

[21] Appl. No.: 971,849

[22] Filed: Dec. 21, 1978

[51] Int. Cl.³ .............................................. F28D 15/00
[52] U.S. Cl. ............................ 165/105; 165/DIG. 12; 29/157.3 R
[58] Field of Search ...................... 165/105, DIG. 12

[56] References Cited

U.S. PATENT DOCUMENTS

| 2,072,486 | 3/1937 | Smith | 165/105 X |
| 2,947,150 | 8/1960 | Roeder, Jr. | 165/105 X |
| 3,143,592 | 8/1964 | August | 165/105 X |
| 3,788,388 | 1/1974 | Barkmann | 165/105 X |
| 3,865,184 | 2/1975 | Grover | 165/105 |

FOREIGN PATENT DOCUMENTS 22272 of 1892 United Kingdom ..................... 165/105

*Primary Examiner*—Albert W. Davis
*Attorney, Agent, or Firm*—A. H. Caser

[57] ABSTRACT

Bidirectional heat exchangers and elements for use therein are provided for application in buildings and other enclosures to introduce fresh outside air and to remove exhaust air while coincidently recovering heat from the warmer air and using it to adjust the temperature of the cooler air.

3 Claims, 10 Drawing Figures

HEAT EXCHANGE APPARATUS

BACKGROUND OF THE INVENTION (1) The Field of the Invention comprises heat exchangers for purposes of recycling waste heat, cooling, and ventilating.

(2) Prior Art

So far as is presently known, conventional heat exchangers employ heating tubes developed in the last century by A. M. Perkins which, as described in U.S. Pat. No. 1,872,363 to Thurm, issued Aug. 16, 1932, comprise a straight evacuated tube containing a suitable heat transfer agent and hermetically sealed at both ends. By exposing one end of the tube to heat, the agent is vaporized, the vapors travel to the other cooler end where they are condensed, giving up heat of condensation which may be recovered. The heated end is usually termed the evaporator and the cooled end the condenser; and if the evaporator is lowered below the condenser, the action is improved by having gravity aid the return of the condensate to the evaporator. These Perkins tubes are used in present day commercial heat exchangers, such as those described in U.S. Pat. Nos. 3,788,388 and 3,865,184, which show operation at orientations ranging from the horizontal to positions in which the evaporator is slightly elevated, or tilted, above the condenser, these tilt positions being described as useful to reduce the efficiency of the unit, even to shutting off the same. Obviously, such elevations are adverse to high heat exchanger capacity because they retard or eliminate the above mentioned effect of gravity. The user of these commercial units is instructed that a favorable tilt, i.e., evaporator below the condenser, is necessary to provide adequate capacity, or to operate in winter, and that a tilt control mechanism is required for year round, i.e., both summer and winter, operation, for frost prevention on the weather face of the exhaust side of a unit, and for regulating the temperature of supply air leaving the unit (and entering a building) to avoid over-recovery of heat. Such a mechanism, which is described in said 3,788,388 patent, comprises at least eight structures, not including a number of flexible connections between the unit and the ductwork, and is expensive as well as detractive of the valued passive quality of the heat exchanger and conducive to a degree of long term unreliability.

It is clear, therefore, from the foregoing that operation of a heat exchanger with Perkins tubes at a horizontal orientation will not provide a desired high heat transport (a result confirmed by work described below), that for high heat transport, among other cases, a favorable tilt is required which for automatic operation necessitates use of tilt-producing and tilt control mechanism, and that operation is reduced or even shut off at unfavorable or adverse tilts. This last result raises a separate problem of unavoidable, accidental, and/or initially undetected adverse tilts which may extend up to 0.5 or 1 inch, or more, and which may be and frequently are present owing to the difficulty, especially with tubes of long length, of determining true horizontal and/or of permanently maintaining it; various reasons may account for the difficulty, such as imprecise use of levelling tools by workmen, or the presence of slight undetected damage to the tubes, or the tendency of buildings to shift, and the like. A heat exchanger employing conventional Perkins tubes is unable to operate effectively, or even at all, in the presence of accidentally produced adverse tilts.

The foregoing disadvantages are avoided by the heat exchanger, and elements therefor, described herein which operates at a horizontal orientation and produces high heat transport without need for tilt mechanisms, and which is substantially insensitive to accidentally produced adverse tilts. Among these and other advantages to be described is the provision of an element having a significantly greater driving head, and thus better heat transport, than a Perkins tube.

SUMMARY OF THE INVENTION

Considering the elements which make up the heat exchanger, which is a tube in the form of a closed loop having a pair of substantially parallel arms connected to each other at their ends by a pair of end pieces or members, with one arm disposed above the other, and having a working agent initially present in the lower arm. A suitable number of loops is disposed in and supported by a frame, usually of rectangular shape, to form the heat exchanger. In use, the unit is usually disposable in a wall between two spaces between which an air interchange is to be made, one of which spaces may be a building or a room therein and the other the outdoors, although both may be buildings or rooms either in the same or different buildings. A first airway is present in the unit for transferring air in one direction, a second airway for transferring air in the opposite direction, and means for keeping the airways separate. The loop elements extend into and between these airways for transferring heat from the air in one airway to the air in the other. The portions or sections of the loops disposed in the first airway may comprise the evaporator section for the agent and receive heat from heated air passing thereover, and the other portions or sections of the loops disposed in the second airway may comprise the condenser section for giving up heat to the air passing thereover. In the evaporator section the agent is vaporizable in the lower arms of the loops with resulting vapors flowing upwardly through adjacent end members to the upper arms and thence along said upper arms to the condenser section where they are condensed and the condensed agent then flowing down the end members adjacent thereto to the lower arms of the condenser section and back to the evaporator section, and as may be apparent, the agent in the forms of vapor and condensate flows cocurrently through each loop in the same direction. Such flow is distinctive, contributing greatly to the described advantages. In a Perkins tube on the other hand the agent vapors flow in one direction and the condensate in the opposite direction, so that a vapor shear effect is created which, if the vapor velocity is great enough, will prevent part or all of the condensate from flowing back to the evaporator, despite the assistance of gravity.

BRIEF DESCRIPTION OF THE DRAWINGS

The invention is illustrated in the accompanying drawings, which are diagrammatic, and in which.

DESCRIPTION OF SPECIFIC EMBODIMENTS

Figure 1:
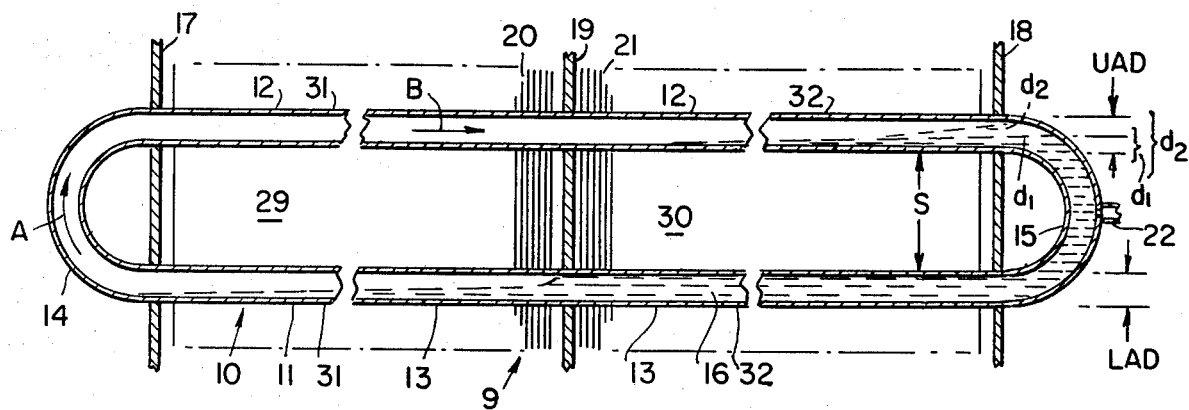
FIG. 1 is an enlarged broken cross-sectional view of a single loop element in a heat exchanger environment.

As shown in FIG. 1, the heat exchanger element 10 comprises a tube 11 in the form of a closed loop consisting of upper and lower arms or legs 12, 13 connected at their ends by end members or pieces in the form of bends 14, 15, with the arm 12 disposed over the arm 13. A working agent 16 is present, initially lying in the lower arm, but which is shown as having a different distribution, to be discussed below. End panels of the heat exchanger 9 are seen at 17, 18 and a central barrier at 19, each of these being suitably apertured to receive and support the loop. At 20, 21 are groups of closely spaced apertured fins engaged by the arms of the loop, and at 22 is a portion of a fill tube for evacuating, charging, and sealing the loop; it is described in more detail below.

Figure 3:
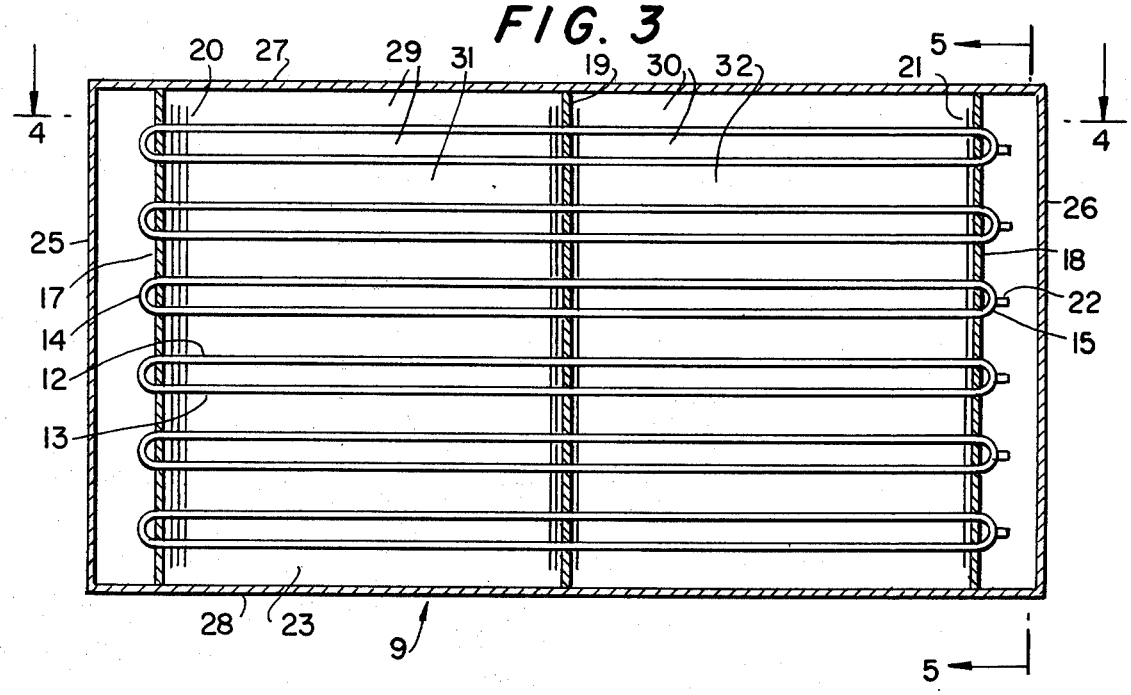
FIG. 3 is a side view, in section, of a heat exchanger employing the loops of FIG. 1 and taken along line 3—3 of FIG. 4.
Figure 4:
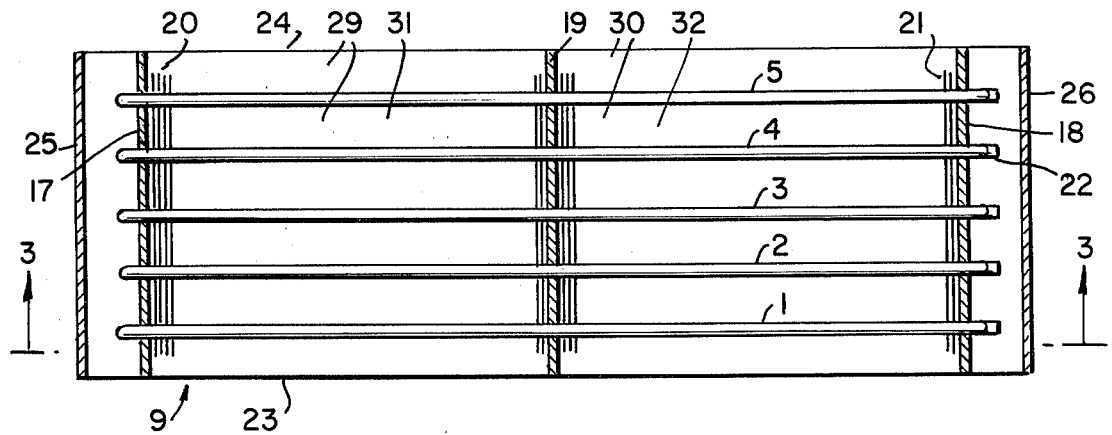
FIG. 4 is a sectional view along line 4—4 of FIG. 3.

FIG. 3 shows a row of loops, six in all, in the heat exchanger, which form one vertical row, while FIG. 4 shows five such vertical rows, numbered 1 to 5, all partially enclosed by a frame comprising end walls 25, 26 and top and bottom walls 27, 28. The sides or faces 23, 24 of the unit are open. The number of loops per row, and rows per unit, are variable. Fins 20, 21 may be seen to extend from top to bottom, each preferably in the form of a continuous apertured plate or sheet and spaced about 12 to the inch, although such spacing is variable. The central thermal barrier 19 divides the unit into two sections or halves 29, 30, the former defined by end panel 17, barrier 19, and walls 27, 28, and comprising a first airway for transferring air through the spaces between loops, and the latter defined by panel 18, barrier 19, and walls 27, 28, and comprising a second airway. If the section or portion 29 is regarded as the evaporator or evaporator section 31, and section or portion 30 as the condenser or condenser section 32, it is apparent that the loops extend into and between the two airways and are capable of transferring heat from the air in one to the air in the other.

Figure 5:
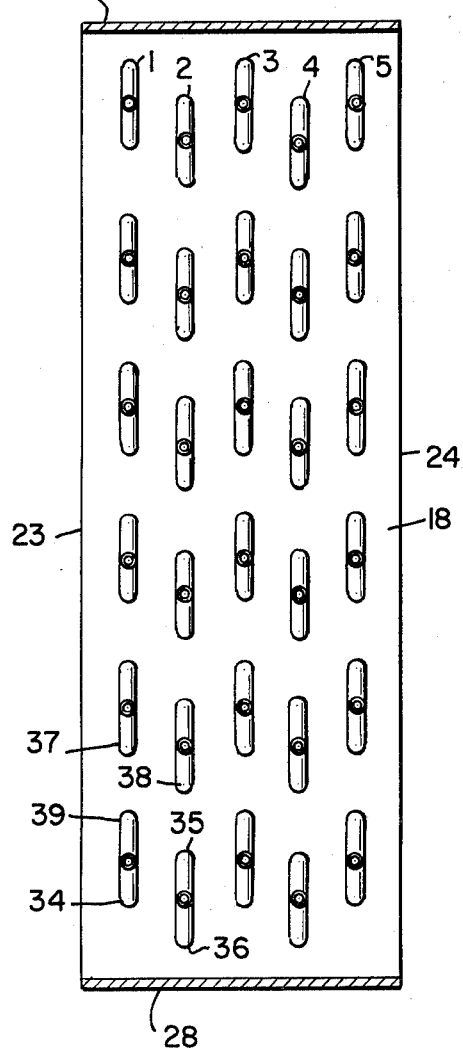
FIG. 5 is a sectional view along line 5—5 of FIG. 3.

FIG. 5 shows how the vertical rows 1 to 5 are vertically offset with respect to each other. Considering loop arms 34, 35, and 36, it may be seen that they form a triad; similarly, arms 37, 38, and 39 form another triad; and in fact such triad groups of arms may be discerned throughout FIG. 5; and if one connects the centers of the arms of each triad to form a triangle, it will be found to be an equilateral triangle each of whose angles is 60°. This is a preferred arrangement for good air-loop contact, although other offset row dispositions are suitable.

Returning to FIG. 1, which is intended to depict steady state operation of a heat exchange loop, if warm exhaust air is flowing through airway 29, say in a direction out of the paper, and cool fresh air is flowing through airway 30, say into the paper, as in winter operation, the agent in the lower arm 13 of evaporator 31 is heated and vaporized. The resulting vapors flow upwardly in the adjacent end bend 14, note arrow A, to upper arm 12, then along such arm to condenser 32, arrow B, where they are condensed, giving up heat of condensation to the incoming cool fresh air in airway 30, then the condensate flows downwardly through return bend 15 to the lower arm 13 of the condenser, and then back to the evaporator. Considering the foregoing circuit in a bit more detail, note that as vapors from the evaporator reach the bend 14, they rise because lighter than the bulk liquid, in turn tending to produce a suction effect which draws more vapors to bend 14. At lower heat inputs, only vapors pass from bend 14 to upper arm 12, but at higher inputs some liquid may be entrained by the vapors; however, since arm 12 is also being heated in the evaporator section, such entrained liquid is converted to vapor. Then in arm 12 of the condenser, where liquid condensate is formed, the flow of condensate to the right is favored by the push or movement of the vapors coming from the evaporator, and such flow together with an assist from gravity, owing to the liquid in bend 15, helps move the condensate down the return bend 15 to the lower arm 13 of the condenser. At that position in the condenser, the condensate may be considered to be a subcooled liquid, i.e., liquid at a temperature below boiling temperature. Notice that the continuous condensation of vapors tends to create a suction effect and thus to require more vapors to be generated in the evaporator. Notice, too, that the flow in arm 13 is from right to left, that is, liquid from the condenser is fed to the evaporator from the side opposite the side where vapors are formed, or to put it another way, from the side where the vapor velocity is zero. This general movement to the left in arm 13 also favors the above described vapor flow upwardly in bend 14. A study of the agent flow in a loop is reported in Example 1.

It is evident that both vapors and condensate flow cocurrently in the same direction through the loop. Such flow, as described, is distinctive by comparison with that in the conventional horizontally orientated Perkins tube 40 of FIG. 2, which is intended to have the same length, diameter, and wall thickness as one of the loop arms of FIG. 1. In tube 40, consider end 41 as the evaporator heated by warm air and end 42 as the condenser cooled by cooler air. The agent 43 is vaporized and the vapors are driven toward the condenser, arrow C, while the returning condensate flows back toward the evaporator, the two being in counterflow. The vapor exerts a shearing effect on the condensate, akin to that of a wind blowing over a lake. If the vapor velocity is high enough, the condensate can be prevented, partly or completely, from flowing back to the evaporator, a result particularly noticeable at a horizontal orientation of the Perkins tube, but also possible at a favorable tilt. The vapor shear simply dominates and reverses the flow of condensate, regardless of the beneficial aid of gravity, so that the condensate collects or bunches up at the condenser end with no place to go. This phenomenon is in contrast to the vapor flow of the loop of FIG. 1 where condensate returning to the evaporator for reboiling cannot be impeded by the vapor velocity but rather is aided by it.

Figure 2:
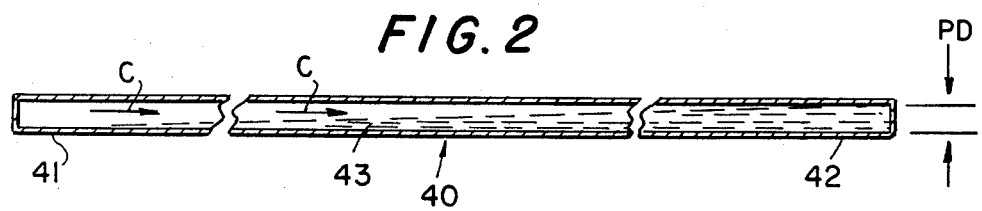
FIG. 2 is an enlarged broken cross-sectional view of a single conventional Perkins tube.

The vapor shear effect in the Perkins tube may be even more readily appreciated when it is seen that the liquid driving head is equal to only one tube diameter, i.d., as represented by the distance PD of FIG. 2, comprising the inside diameter of tube 40, a head which is rather easily overcome by the countercurrently flowing vapors. It is to increase the head PD that the art applies a favorable tilt to conventional Perkins tubes. On the other hand, the liquid driving head in the loop of FIG. 1 is equal to the distance S plus LAD plus at least half of UAD, where LAD is the lower arm diameter, i.d., and UAD is the upper arm diameter, i.d. The level of liquid in the upper arm at the right hand end of condenser 32 is variable, and as shown, may range from the level at $d_1$, which is about $\frac{1}{2}$ the arm diameter, to the level at $d_2$, which is the full diameter. S is the distance between near adjacent surfaces of the loop arms. The liquid driving head is thus defined:

Head = S plus 1D plus 0.5 to 1D, or

Head = S plus 1.5 to 2D   (1)

where D is the loop arm diameter. Now S may preferably vary from 2 to 25 loop arm inside diameters, so that said Head may range from 2 plus 1.5 to 2D to 25 plus 1.5 to 2D, or from a minimum of 3.5 diameters to a maximum of 27 diameters. Since D is also equal to the Perkins tube diameter PD, a comparison may be formulated; if S equals 2 diameters, and assuming a neglible wall thickness, the ratio of the loop liquid head to the Perkins tube liquid head is $$\frac{2D \text{ plus } 1.5 \text{ to } 2D}{D}$$

or 3.5 to 4 times greater; and if S equals 25 diameters, it is $$\frac{25D \text{ plus } 1.5 \text{ to } 2D}{D}$$

or 26.5 to 27 times greater.

The superiority in liquid driving heads is even more marked when it is observed that in the loop the cocurrent vapor flow reinforces the liquid head, rather than lessen it as in FIG. 2, so that the total loop driving head is the liquid head plus the reinforcing vapor flow. Higher driving head, of course, means higher heat transport and less sensitivity to unfavorable tilt.

As indicated, the loop arm spacing, S, is preferably 2 to 25 arm diameters; more particularly, it may range from about 2.4 to 4 or 5 arm diameters. On this basis, and using equation (1) above, the liquid driving head may vary from 3.9 to 7 arm diameters, or 3.9 to 7 times greater than that of said Perkins tube. Whether the broader or narrower range of arm spacing is considered, it is clear that the liquid head is more than 3 times greater than the Perkins. If a lower driving head is tolerable, S may also equal one arm diameter, the liquid head then being 2.5 to 3 diameters or 2.5 to 3 times greater than that of the Perkins tube, which is still a sizable improvement.

Figure 6:
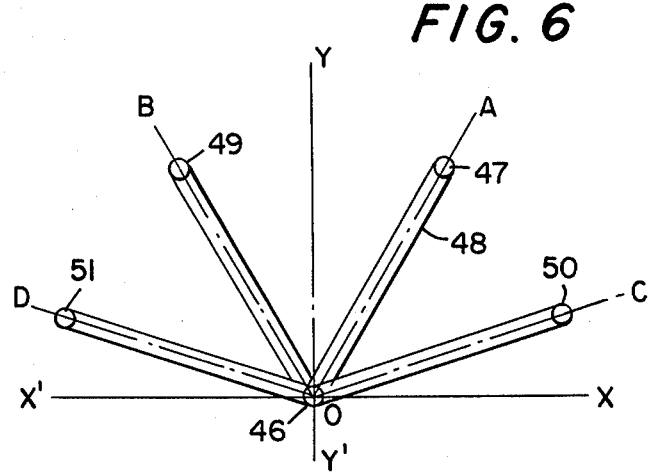
FIG. 6 is a diagram showing the disposition of the upper and lower arms of a loop relatively to each other and to the horizontal.

To obtain the advantages of the invention, the upper arm 12 is required to be above the lower arm 13, as described, and preferably directly above it, although a measure of variation is possible which may be described by reference to FIG. 6, showing lower and upper arms 46, 47 of a loop 48. Lower arm 46 has a horizontal line X'X intersecting its longitudinal center line at point O. Only the end of said center line is visible at point O. A horizontal plane passing through line X'X and the arm 46 center line would have both lines lying in it. Now visualize a plane passing through the line OA which joins the center lines of arms 46, 47, and notice that this plane makes an angle AOX with the said horizontal plane. The value of angle AOX is 60°, which represents a preferred angular relationship, and the latter may range up to 120°, this being the angle BOX formed when the upper arm 47 is to the left of arm 46 in the position shown at 49. Accordingly, a preferred angular relationship of the arms relatively to the horizontal is such that a plane passing through the longitudinal center lines of the arms makes an angle of 60° to 120° with a horizontal plane passing through the longitudinal center line of the lower arm. A wider useful range is 15° to 165°, involving the positions 50, 51 of the upper arm and the angles COX and DOX. A still more preferred disposition is that described, where the upper arm is directly over the lower, i.e., 90°, corresponding to angle YOX.

It may be apparent in FIG. 6 that the lines X'X and Y'Y comprise the X and Y axes of a set of plane or rectangular coordinates wherein O is the origin or point of intersection of the axes. Also, as indicated earlier, the spacing S between loop arms may preferably range from 2 to 25, more preferably 2.4 to 4 or 5, and as broadly as 1 to 25, arm diameters. These two quantities, angular disposition of the arms and the spacing therebetween, serve to define the position of the arms relatively to each other and relatively to the horizontal. If the center lines of both arms of a loop lay in the horizontal plane passing through the line X'X, the advantages of the invention are not obtainable; one would simply have the Perkins tube of FIG. 2, in closed loop form, with the disadvantages described herein.

Figure 7:
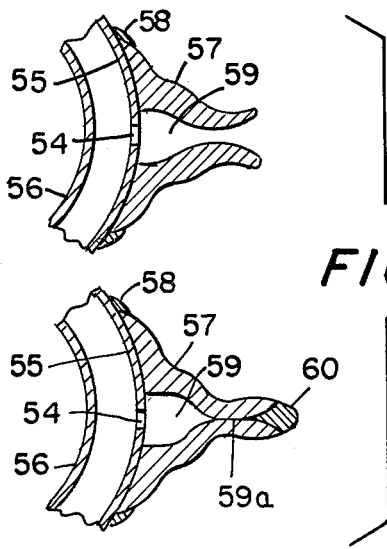
FIG. 7 is an enlarged fragmental cross-sectional view of the fill tube of FIG. 1 in the open and closed positions.

Each loop may be conveniently formed by taking two straight thoroughly cleaned tubes of the desired dimensions, then belling or flaring both ends of each, then taking a cleaned return bend, preferably die formed, and inserting its ends into the adjacent flared ends of the two tubes, taking a second return bend and similarly engaging it with the opposite flared ends of the tubes, and brazing the return bends to the tubes, as with silver solder to get a joint of high melting point, to form a loop with vacuum-tight joints. However, before attaching one of the bends, a fill tube is desirably first installed on it, note FIG. 7, by drilling an opening 54 in the outer wall 55 of the bend 56, and over such opening a fill tube 57 is attached, so that the bore 59 is in registration with opening 54. Conveniently, the attachment is by means of brazing or a weld 58. A valve (not shown but illustrated in U.S. Pat. No. 4,050,509) is attached to the fill tube and its outboard side connected to a high capacity vacuum pump. With the valve open, the loop is evacuated of all air and non-condensible gases and until a hard vacuum in the range of 0.00005 to 0.00001 mm. mercury is obtained, after which the valve is closed, and the pump is disconnected. The loop is then charged with working agent, using conventional means. The fill tube is pinched shut, as at 59a, the valve is removed, and the fill tube end is welded at 60 to permanently close off the same. Each loop is thus hermetically sealed to prevent agent from leaking out and air from leaking in.

Suitable working agents are those which exhibit a reasonable vapor pressure of 5 or 10 to 200 psia at room temperature; are reasonably safe to handle; are compatible with the loop material; are capable of being alternately vaporized and condensed in the loop under the conditions of use; and are reasonably priced. They may include the following, alone or in combination with one or more others:

"Freon" 13B1 CBrF$_3$
"Freon" 502 CHClF$_2$/CClF$_2$CF$_3$
"Freon" 22 CHClF$_2$
"Freon" 115 CClF$_2$CF$_3$
"Freon" 500 CCl$_2$F$_2$/CH$_3$CHF$_2$
"Freon" 12 CCl$_2$F$_2$
"Freon" C-318 C$_4$F$_8$ (cyclic)
"Freon" 114 CClF$_2$CClF$_2$
"Freon" 21 CHCl$_2$F Also such fluorinated compounds as 1,1-difluoroethane, 1,1,1-chlorodifluoroethane, and hexafluoroacetone; hydrocarbons like propane and butane; and compounds such as ammonia, acetone, methyl chloride, ethyl chloride, methyl formate, ethylamine, and sulfur dioxide. Careful attention should be paid to the chemical compatibility of the agent with the loop material as even low rates of chemical reaction may produce non-condensible gases which, over the lifetime of the loops, may accumulate to such as extent as to render the condenser inoperative. Ammonia has been found to have good long term compatibility with carbon steel and to suitably meet the other described qualifications. "Freon" 22, b.pt. $-41.36°$ F., is a preferred agent for room temperature applications. Preferred amounts range from 37.5 to 42% of the loop volume, although amounts of 34 to 51.3% of loop volume may be used. An amount as low as 26.8% of loop volume is useful provided some reduction in heat transfer performance can be tolerated. These volume amounts of agents are measured at the approximate temperature of operation of the loops. Earlier boiling of agent may be promoted by addition of a small amount of a lower boiling agent, say 1 to 13% by weight of the higher boiling agent. For example, addition of 14.9 gms. (3% by wt.) of Freon-13B1, b.pt. $-71.95°$ F., to 482 gms. of Freon-22 promotes boiling at a lower temperature, and thus favors heat transfer by boiling over heat transfer by conduction, the former being more efficient. In turn, evaporator heat transfer coefficients are improved. In selecting a lower boiling material to be added to the working agent, care is required to avoid forming a maximum boiling azeotropic mixture, although minimum boiling azeotropes may be useful if they meet the conditions described.

Tests of the performance of a loop are described below but may be summarized briefly to the effect that the loop did not suffer burnout at a high adverse tilt of 0.88 inch whereas in a comparable run a Perkins tube showed burnout at adverse tilts of only 0.09 and 0.22 inch. Burnout, as described in Example 2, is the point at which the tube will not function. A loop as long as 20 feet showed no burnout at an even greater adverse tilt of 0.97 inch. In Example 3 a 20-ft. loop operated at a power more than two times greater than that of a comparable Perkins tube, and in a separate test reached a power level of 2000 watts; in fact, only the limitations of the electric heaters prevented a greater level from being attained. In the same run, superheating of the vapor was demonstrated, which is not thought to be possible in a Perkins tube; and also in the same run, superior heat transfer coefficients were shown in a horizontal orientation over an adverse tilt.

In the manufacture of the heat exchanger unit the fin plates 20, 21 are formed full size and apertured to receive the loop arms. If desired, shallow channels may be pressed into the plate between loops to aid air-fin contact. The arms of the loops are desirably chosen from small diameter tubes, $\frac{3}{8}$ inch up to 1 inch or more, o.d., for which U.S. industry is tooled and which are standard in industrial practice, although larger diameter tubes are useful. The tubes are inserted through the apertures of the fins, end panels, and barrier, then they are expanded to produce an intimate contact therewith, after which the end bends (one of each loop pair having a previously attached fill tube) are attached as by silver soldering; and evacuation, charging, and sealing are carried out. Very large heat exchangers may be built using loops of lengths greater than 12 feet, measured between end bends. Levelling of such long units is feasible to within 1 inch, but becomes more difficult as the lengths approach 20 feet. But as shown in Example 4, at adverse tilts of 1 and 2 inches the unit does not become inoperable but rather undergoes some reduction in efficiency; in fact, at an adverse tilt of 1 inch the reported efficiencies are still respectable at 55 to 57%, and could be increased by operating at higher power. Other means for increasing the efficiency include the above described step of using two agents to obtain earlier boiling; and also conventional methods of improving heat transfer. The use of the loops permits the unit to be bolted down and rigidly attached to the air ducts, resulting in a bidirectional and completely passive unit free from additional structures that detract from reliability. And while the invention is specially addressed to units of long length, owing to the problem of adverse tilts associated with them, it is not limited in this way and may usefully be applied to units of shorter length, say below 8 ft., or 6 ft., with which it is feasible to employ loops made from tubes of smaller diameter, say from $\frac{1}{8}$ of $\frac{1}{4}$ to $\frac{3}{8}$ inch, o.d.; further, units are contemplated measuring only about 12 inches in length by 6 inches in height having about 40 loops, suitably arranged in rows, and whose arms are $\frac{1}{8}$ or even 1/16 inch in diameter, o.d. A further advantage is the freedom of the individual loop from instabilities, as in situations where one loop may be carrying somewhat more power than neighbor loops.

The invention is applicable wherever it is desirable to recover thermal energy exhausted with air from HVAC (heating, ventilating, and cooling) systems and industrial process equipment, and especially where the mass flow is large or where significant temperature differences exist betwen the exhaust product and incoming air. Example include year-round ventilation systems for office buildings, shops, hospitals, laboratories, restaurants, churches, schools, hotels, libraries, apartments, courts, theaters, auditoriums, and the like, and buildings that house processes like baking ovens, dryers, paint sprayers, etc. Also vehicles like the passenger or other compartments of trucks, cars, military vehicles, and including ships and aircraft.

Tests of the loop-containing heat exchanger were made, described in Example 4, and as will be recognized, a meaningful measure of its performance is heat exchange efficiency. Briefly, it was found that efficiency (as defined in said example) increased with increasing power transported; that efficiency was good at an adverse tilt of 1 inch and, as expected, better at a favorable tilt; and that as between a horizontal orientation and an adverse tilt of 1 inch, efficiency was substantially insensitive to such tilt, a result that would be increasingly apparent at smaller adverse tilts. In example 5 a high efficiency was reached, ascribed to an unbalanced air flow.

The invention may be illustrated by the following examples.

EXAMPLE 1

Figure 8:
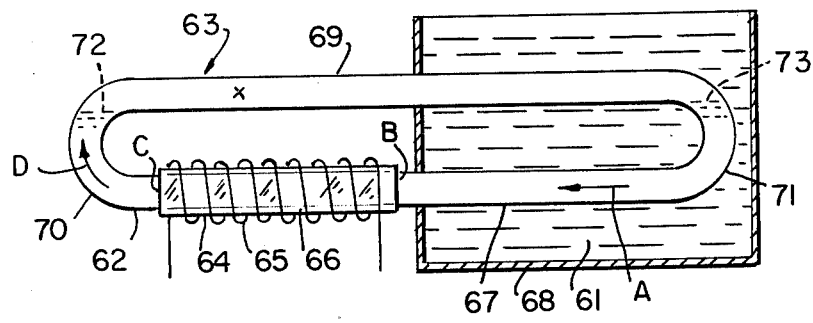
FIG. 8 is a sketch of test apparatus for Example 1.

The flow of agent in a single loop was studied in the apparatus shown in FIG. 8, where part of the lower arm 62 of an 8-ft. loop 63 of 5/8-inch copper tubing was replaced by a transparent glass tube 64 about 32 inches long around which was wound an electrical resistance wire 65 to supply heat. Ends of the wire were connected to a power source not shown, and included in the circuit were means for measuring the power. The loop and first been thoroughly cleaned, evacuated of all air and non-condensible gases, and charged with 600 gms. Freon-11, representing 56% of the internal loop volume. The heated side 66 of the loop comprised the evaporator, while the other side 67, comprising the condenser, was disposed in a water bath 68 containing tap water 61 at about 55° F. A thermocouple was disposed at the point X in the upper arm 69 of the evaporator. Leakproff hermetic connections between ends of the glass and copper tubes were made conveniently using a nut having internal threads on one side for engaging corresponding threads on the copper tube, and having on the other side a rubber O-ring for engaging the glass tube.

With the loop in a horizontal orientation, as determined by use of a transit, the agent was observed to completely fill the glass tube before application of heat, and it was considered that the agent filled both end bends 70, 71 to levels indicated by broken lines 72, 73. Heat was applied corresponding to 10 watts of power, but no change in the agent was observed in the glass tube. At 15 watts, the liquid was seen to suddenly decrease in volume until it filled only ⅔ of the glass tube, and intermittent slugs or bodies of liquid from the condenser were seen to travel slowly in the direction of arrow A to the evaporator. These slugs were apparently reflected back on meeting the end bend 70, as indicated by an intermittently rising level. As power was gradually increased to 200 watts, the slugs moved faster but were still appearing intermittently; between such appearances the liquid was quiescent and, at higher powers, its level decreased to about ⅓ of the tube diameter, while the slugs assumed an annular form.

The loop orientation was changed by dropping the evaporator side 1 inch below horizontal, and the foregoing applications of power and observations repeated. The direction of flow remained the same, and other observations were generally unchanged. Then the evaporator was raised 1 inch above horizontal, and the process repeated, but essentially the same results were observed although the level of liquid tended to be greater in the condenser.

The evaporator was next raised 2 inches above horizontal, and at 100 watts the liquid level between slugs filled the glass tube completely adjacent the condenser (point B), but only to about 10 to 20% of the tube diameter adjacent the end bend 70 (point C), indicating considerable vaporization to be occurring. At 200 watts the slug velocity was estimated to be 1 to 2 ft./sec. and slugs were moving from condenser to evaporator.

As it appeared from the last test that there was considerable vaporization in the evaporator, and that the condenser was filling to capacity, the amount of agent in the loop was reduced so that it represented only 34% of the loop volume at 70° F. At a 2-inch elevation of evaporator above horizontal, the agent level was quite reduced, so the elevation was dropped 1 inch. Power was applied as before. Typical slugs were observed, except that at high powers, such as 200 watts, they were less fully formed, owing probably to the reduced amount of agent; however, their velocities at high powers were estimated to be about 10 ft./sec., and they had some resemblance to an annulus, indicating annular flow. The loop was then brought to a horizontal position and the testing repeated. At very low powers, slugs several inches in length tended to form and to move slowly (less than 1 ft./sec.) in the direction of arrow A; at high powers the slugging ceased, the glass tube appeared to be about 40% full, and the loop operated smoothly with agent flow in the direction of arrow A.

In all the foregoing tests, and at varying power levels and different orientations, it was obvious that the agent flow was in one direction, that of arrow A. Where vaporization took place, the vapors always flowed in the direction of arrow D, they were condensed in the condenser, the condensate returned to the lower arm 67 via return bend 71 and then passed to the evaporator. Both liquid and vaporous agent were thus flowing in the same direction, i.e., cocurrently.

EXAMPLE 2

This example compares the behavior, in respect of burnout, of a prior art Perkins tube and a present loop, both 8 ft. long and of copper and both at a negative or adverse elevation, i.e., evaporator above the condenser. The Perkins tube was simply a straight length of tube, while the loop had its arms 1.5 inches apart, as measured between the longitudinal center lines of the two arms, or 0.94 inch in terms of the distance S of FIG. 1, neglecting the tube wall thickness. Both tube and loop had been evacuated of air and non-condensibles, charged with agent, and sealed, under comparable conditions. In both cases heat was applied to the evaporator under comparable conditions. Vapor temperatures were determined by measuring vapor pressure with a precision pressure gage and then using Freon tables (DuPont) to convert pressure to temperature.

Additionally, a test was made of a 20-ft. loop, having its arms spaced apart 2.06 inches between center lines (S of FIG. 1 equal to 1.5 inches), at an adverse elevation. The results with both loops demonstrate their ability to transport heat at significant adverse orientations and over long lengths. The data follows:

| Run No. | Perkins Tube | | Loop | |
|---|---|---|---|---|
| | 1 | 2 | 3 | 4 |
| Length, ft. | 8 | 8 | 8 | 20 |
| o.d., inch | 0.625 | 0.625 | 0.625 | 0.625 |
| i.d., inch | 0.555 | 0.555 | 0.555 | 0.555 |
| Adverse elevation, inch | 0.22 | 0.09 | 0.88 | 0.97 |
| Working agent | Freon-12 | Freon-12 | Freon-12 | Freon-12 |
| % of tube or loop volume | 48.6 | 48.6 | 49.4 | 42.9 |
| Vapor temp., °F. | 77 | 137 | 103 | 58.4 |
| Power level, watts | 334 Burnout | 473 Burnout | 600 No Burnout | 590 No Burnout |

Comparing Runs 1 and 2 with 3, it will be seen that although the loop was disposed at a more severe adverse orientation than the Perkins tube, being 4 and 5.5 times greater, no burnout took place, whereas burnout occurred in the Perkins tube and at considerably lower power levels. Burnout is the point at which the tube will not function, i.e., its capacity for transporting heat is so drastically reduced that it is inoperative owing to the fact that all the agent has flowed out of the evaporator into the condenser; it is detectable from the fact that the evaporator, or any part of the same, suddenly increases in temperature to a value substantially equal to that of the heat source; below burnout temperature the evaporator temperature is always related linearly to the amount of power carried by the tube, and above burnout temperature the evaporator temperature is not related to the amount of power transported. Burnout can be determined by gradually increasing the applied power, measuring the evaporator wall temperature and the vapor temperature at each power level, and then plotting the power versus the difference of the two temperatures to obtain a curve which, at burnout point, shows an asymptotic increase of the temperature difference. Burnout point can also be determined by keeping the power constant and changing the adverse elevation until the temperature of the evaporator wall increases asymptotically. Although different agents were used in the foregoing runs, this was not a significant factor influencing the results because both Freon-12 and Freon-22 have essentially the same properties at the test temperatures; they are used interchangeably in low temperature air-to-air heat exchangers. Also, the difference in agent volumes was not a factor; in fact, the volume used in the Perkins tube was near optimum for that device. Run No. 4, together with No. 3, illustrate the insensitivity of the loops to significant adverse elevations, elevations which are greater than those unavoidably encountered in commercial manufacturing, installation, and maintenance practice. These runs further demonstrate the potential of the loops for use in long heat exchangers.

EXAMPLE 3

Figure 9:
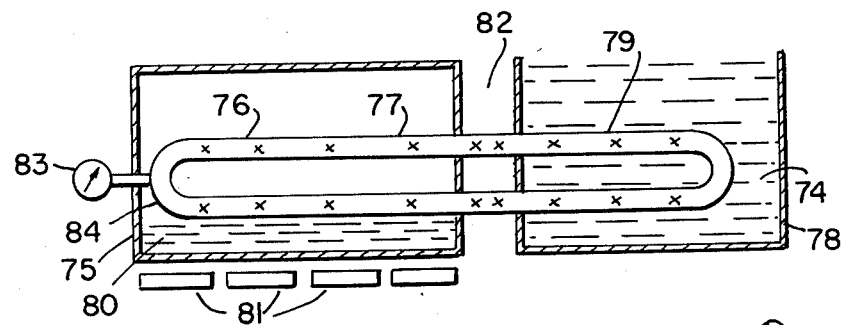
FIG. 9 is a sketch of test apparatus for Example 3.

This example describes power transport tests on a loop of long length (20 ft.) and presents some date on maximum power and heat transfer coefficients. A 20-ft. loop (measured from the end of one end bend to the other) of ⅜-inch o.d. copper tubing, with arms spaced apart 1.5 inches between center lines (S of FIG. 1 equal to 0.94 inch), after evacuation and charging with 985 gms. (814.4 cc. or 42.38% of loop volume at 70° F.) Freon-22, was supported in the apparatus shown in FIG. 9 comprising an insulated tank 75, in which was disposed a 10-ft. portion 76 of the loop 77 as the evaporator, and a container 78, in which was disposed an 8-ft. loop portion as the condenser 79. Tank 75 contained a 50-50 mixture 80 of water and methanol which was heated to vaporization by electric heaters 81 placed outside and just below the tank, while container 78 held flowing tap water 74 at about 50° F. to condense the Freon vapors within condenser 79. A separating space 82 of two feet length, to which heat was not positively added or subtracted, was kept between evaporator and condenser to prevent heat flow from one to the other and to permit more accurate temperature measurements of the outside loop walls by means of thermocouples located at the points marked with an x. A pressure gage 83 provided vapor pressure readings in the end bend 84, and by using conventional Freon-22 (DuPont) pressure-temperature tables, the corresponding vapor temperatures could be obtained. An absolutely perfect horizontal orientation of the loop over its length of 20 ft. could not be obtained, but by means of a calibrated surveyor's transit a horizontal position was secured accurate to ⅛ inch.

Data for a loop power run follows, and for contrast there is presented along side comparable data thought to be typical of operation in a 20-ft. Perkins tube made of ⅜-inch copper tubing.

|  | Loop | Perkins Tube |
| --- | --- | --- |
| Length, ft. | 20 | 20 |
| o.d., inch | 0.625 | 0.625 |
| i.d., inch | 0.555 | 0.555 |
| Orientation | Horizontal ± ⅛ inch | Horizontal |
| Agent | Freon-22 | Freon-22 |
| % of tube or loop volume | 48.38 | 40 |
| Vapor temperature, °F. | 69 | 50 |
| Power, watts | 955.4 | 211 |
| Maximum power, watts | 2000 | 211 |
| $h_e$, BTU/hr-ft²-°F. | 204 | — |
| $h_c$, BTU/hr-ft²-°F. | 1037 | — |
| Superheat in vapor, °F. | 4.4 | — |

Commenting on the above data, it is evident that higher power (measured from current and voltage readings in the electric heater circuit and using the equation, P equals EI) was obtained with the loop, 955.4 watts with no burnout as against 211 watts with burnout for the Perkins tube; and even if the latter value is doubled to take into account the use of two arms in the loop, the comparison for the loop is quite favorable, 955.4 watts vs. 422 watts. The lower power in the Perkins tube is attributed, at least in part, to the vapor shear effect, described above, arising from the countercurrent flow of vapor and liquid agent, and also to the small liquid driving head of 0.555 inch as against a head of S plus 1.5D (minimum) or 0.94 plus 1.5 (0.555) or 1.77 inches for the loop.

While there is a difference in vapor temperatures in the two runs, 69° vs. 50°, it does not account for the difference in power because if the vapor temperature in the Perkins tube were increased from 50° to 69° F., the improvement in power transport would be from 211 watts to only about 230 watts before burnout took place.

In addition, the loop was tested to the thermal capacity of the apparatus by replacing the water-methanol mixture with water and then increasing the applied power to 2000 watts, with no indication of energy transport failure, although heat transfer coefficients decreased somewhat, as expected. It is felt that even greater power could have been applied had the electric heating capability been greater. For the Perkins tube, maximum power corresponded to the power at burnout, 211 watts.

Heat transfer coefficients, $h_e$ and $h_c$, were determined by the equation, $$h = \frac{\text{Power} \times 3.413}{\text{Area of Surface (Vapor temp.} - \text{Surface temp.)}}$$

where 3.413 is a conversion factor, watts to BTU/hr, and "Surface" refers to the evaporator or condenser surface. As an example, the calculation for $h_c$ is $$\frac{955.4 \times 3.413}{1.45 \text{ ft.}^2 (69 - 66.83)} \text{ or } 1037 \text{ BTU/hr} \cdot \text{ft}^2 \cdot °F.$$

The $h_e$ and $h_c$ values of 204 and 1037 are to be compared with the corresponding values of 194 and 413 obtained for the 20-ft. loop of run No. 4 of Example 2 above, which was operated at an adverse elevation of 0.97 inch, indicating that in the latter run the condenser was partly flooded because of the adverse tilt and showing such operation to be inferior to that with a horizontal orientation. The lower coefficients mean lower efficiencies.

The item "Superheat in vapor" was obtained thus, $73.4° - 69° = 4.4°$, where $73.4°$ was the temperature in the space 82 and 69° was the reported vapor temperature. Superheated vapor is vapor at a temperature above the boiling temperature. The value of 4.4° is of interest to show that the loop is independent of the critical temperature of the agent. By contrast, in a Perkins tube the operation depends on the presence of both a liquid phase and a vapor phase of agent, and it will not operate when only one phase is present; and as is known, at the critical temperature the liquid density and the vapor density are the same, signifying one phase.

EXAMPLE 4

A heat exchanger experiment was performed the purpose of which was to remove stale warm air from a building and to replace it with fresh cool outside air using a heat exchanger of the invention to remove heat from the exhaust air and to transfer it to the incoming air.

The heat exchanger was like that shown in FIGS. 3-5, except that more loops were present, there being 6 vertical rows each having 12 loops, or a total of 72 loops. Each loop was 72 inches long, exclusive of the end bends, so that a 36-inch length was present on each side of the central barrier. Center-to-center loop arm spacing (note FIG. 5) was 1.5 inches, meaning that a given loop arm was 1.5 inches distant from each of the nearest arms (6 in all) surrounding it. Loop arms and the later-added end bends were of copper tubing of 0.625 inch (⅝ inch) o.d. and 0.603 inch i.d. Aluminum fins of 0.10 inch thickness were arranged 12 per inch and had been pressed to provide shallow channels, 3 channels between each pair of loop arms, to improve the air-to-fin contact. Each fin was in the form of a continuous rectangularly-shaped sheet, of the general shape of the end panel shown in FIG. 5, with apertures for receiving the loop arms. These arms, of course, were inserted through the fin apertures, and also through the end panel and barrier apertures, before connecting each pair of arms by an end bend by silver soldering. Short fill tubes were welded to the end bends on one side of the device.

After a leak check on the silver-soldered end bend joints, each loop was subjected to evacuation of all air and non-condensible gases by means of a high capacity vacuum pump. For this purpose a valve (not shown) was attached to the open end of the fill tube and the outboard side of the valve connected to the pump; with the valve open, the pump was operated for about 15 minutes until a hard vacuum of about 0.0001 mm. of mercury was obtained, after which the valve was tightly closed and the pump disconnected. The outboard side of the valve was then connected to a tank of Freon-22, the connecting line evacuated of air and non-condensibles, the valve opened, and a predetermined charge of agent comprising about 50%, plus or minus 3%, of the volume of the loop was introduced. The valve was closed, the Freon tank removed, and verification of the average loop charge was carried out, showing it was about 436.6 gms. or 50.47% of the loop volume at 70° F. Then the fill tube was pinched shut, the valve removed, and the fill tube end welded permanently shut. Each loop was thus hermetically sealed so as to be leakproof and vacuum tight. The charging procedure is described and illustrated in U.S. Pat. No. 4,050,509.

Figure 10:
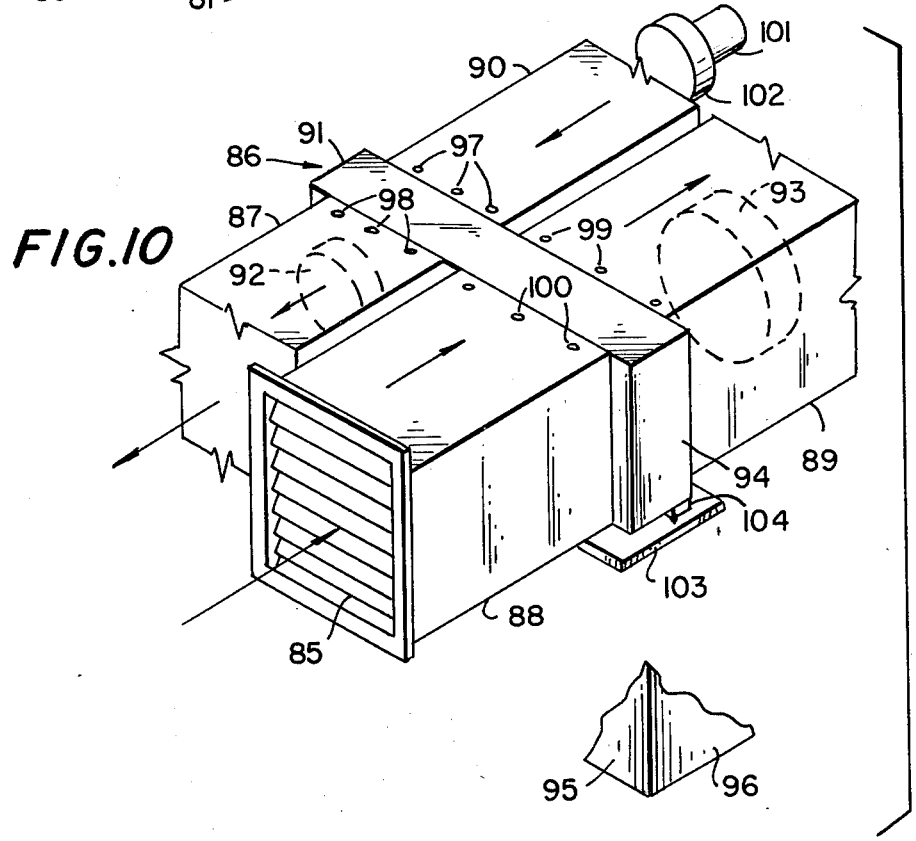
FIG. 10 is a perspective view of test apparatus for Example 4.

When completely assembled, with the loops supported on the end panels and on the central barrier, and with top, bottom, and end walls in place, the heat exchanger had the following approximate dimensions:
Length 75 inches
Fin length 72 inches
Height 39¼ inches
Fin height 36¼ inches The fully assembled heat exchanger was then disposed in a test set-up similar to that shown in FIG. 10, illustrating the heat exchanger unit 86 positioned across the air ducts 87, 88, 89, 90. Stale warm building air was drawn into inlet duct 90 and through the evaporator side 91 of the unit 86, where it gave up heat, by the suction fan 92 disposed in outlet duct 87 and discharged through the latter, usually to atmosphere at a more remote point. Fresh cool air from outside was drawn by suction fan 93 through intake 85 into duct 88 and then through the condenser side 94 of the unit where it picked up heat; the warmed intake air was then passed through duct 89 to be used in the building. Conveniently, the intake 85 may be formed in a wall 95 of the building 96. Thermocouples for measuring air temperatures were inserted through openings 97, 98, 99, 100 on both sides of the unit and disposed at approximately the midpoints of the faces of the unit. For more severe tests, a propane burner 101 (capacity, 150,000 BTU/hr) with an associated blower 102 was disposed in duct 90 about eight or more feet away from the unit to increase the temperature of the stale building air; the effect of this added heat was to work the loops harder, thus increasing their capacity over and above that which would be required of them during normal service. In addition, the unit was positioned on a rigid steel frame 103 to permit changing its level or tilt by means broadly designated at 104.

The following data were obtained.

| Run No. | 1 | 2 | 3 |
|---|---|---|---|
| Approximate level of thermal energy transferred per loop, watts | 200 | 470 | 866 |
| Average outside air temperature, °F. | 18 | 20 | 18 |
| Average air temperature on building side of unit, °F. | 55 | 100 | 163 |
| Propane burner used? | No | Yes, at 12 ft. from unit face | Yes, at 8 ft. from unit face |
| Average air flow of building exhaust air to unit, ft./min. | 250 | 250 | 250 |
| Average air flow of | | | |

-continued

| Run No. | 1 | 2 | 3 |
|---|---|---|---|
| outside air to unit, ft./min. | 250 | 250 | 250 |
| Efficiency of Heat Exchanger: | | | |
| At horizontal orientation, % | 55 | 58 | 60 |
| With evaporator side depressed 1 inch below horizontal, % | 58 | 63 | 63 |
| With evaporator side raised 1 inch above horizontal, % | 55 | 56 | 57 |
| Vapor temperature during operation, °F. | 36.5 | 60 | 90.5 |

Regarding the foregoing data, air temperatures were measured by means of the described thermocouples and are the average of 3 readings. Air flows were determined at several locations with a Hastings Airmeter and a Davis Instrument Anemometer and are the average of several readings. The horizontal orientation of the exchanger was determined by aid of a calibrated Hilger and Watts microptic clinometer. The thermal energy level was calculated in the manner illustrated in Example 5 below. Heat exchanger efficiencies were determined on the basis of the outside air supply side of the exchanger, according to the equation $$\text{Efficiency} = \frac{\text{Temperature difference on supply side}}{\text{Maximum available temperature difference, i.e., temperature of exhaust air minus temperature of outside air}}$$

The efficiency is defined as the percentage of energy extracted from the exhaust air and introduced into the supply air stream. If the exchanger were able to bring the outside air temperature up to the temperature of the exhaust air, its efficiency would be 100%.

It is apparent from the data that the efficiency tended to increase with increase of thermal energy transport. Further, the level of thermal energy transport corresponds to that necessary for practical large scale air-to-air heat exchangers for building ventilation purposes where conservation of energy is desirable. Efficiency increased appreciably at a favorable tilt, i.e., with the evaporator side 1 inch below the horizontal, by comparison with a horizontal orientation or with an unfavorable tilt, i.e., evaporator side 1 inch above the horizontal. When the evaporator was lowered 2 inches, the efficiency increased to 62% at the 200 watt level, and when lowered 3 inches, the efficiency reached 65%.

Note that with the evaporator 1 inch above horizontal, good efficiencies are still obtainable. Considering the loop arm i.d., 0.603 inch, such elevation of 1 inch is equal to 1/0.603 or 1.66 diameters of the arm, and as reported, the efficiency ranged from 55 to 57%. When the evaporator was raised 2 inches, corresponding to 2/0.603 or 3.32 arm diameters, the efficiency was 51.2%. These results are in contrast to those described in said Patent 2,788,388 which states that the unit is actually turned off when the evaporator is raised a few tube diameters. The work of the present example thus demonstrates the invention to be substantially insensitive to small deviations from the horizontal. Further, with a heat exchanger having 8 vertical rows instead of 6, everything else being as in Run No. 3 above, the expected efficiency at horizontal orientation would be 66.67%, and with the evaporator depressed 1 inch below the horizontal, it would be 69.42%. Even higher efficiencies are possible if conventional heat transfer-improving steps are used, such as the use of two agents as previously described, or of circumferentially disposed metallic wicks.

Despite many tests, no instabilities in performance of the heat exchanger were observed under any or all conditions of orientation that were tried.

The above-described operation of FIG. 10 may be termed winter operation. In summer, fresh warm outside air is drawn through intake 85 and duct 88 and through the right hand side of the unit, which now serves as evaporator, where it gives up heat, and then is passed into the building. Cooler building exhaust air in duct 90 passes through the left hand side of the unit, now serving as condenser, where it picks up heat and is then discharged to atmosphere through duct 87. Whether the action is termed winter or summer operation, or bidirectional, i.e., inclusive of both summer and winter operation, what is controlling of course are the temperatures of the two air flows.

EXAMPLE 5

The work of Example 4 was repeated with the heat exchanger in a microptic clinometer-determined horizontal orientation but using different air flow rates, measured at room temperature, for the intake and exhaust flows. Calculations are given for the amount of heat transferred per hour and also for the thermal energy level per loop. A propane burner was used to heat the building exhaust air, as described in said example; and each reported temperature is the average of 3 readings.

| | |
|---|---|
| Outside air: | |
| Average temperature at or near outside face of exchanger, °F. | 26.67 |
| Average temperature at or near inside face of exchanger, °F. | 109.47 |
| Air flow rate, ft./min. | 250 |
| Building exhaust air: | |
| Average temperature at or near outside face of exchanger, °F. | 87.7 |
| Average temperature at or near inside face of exchanger, °F. | 154.9 |
| Air flow rate, ft./min. | 310 |
| Efficiency at outside air supply side of exchanger, % | |
| Heat transferred: | |
| At outside air supply side of exchanger, BTU/hr. | 202,472.98 |
| At exhaust air side of exchanger, BTU/hr. | 203,764.11 |
| Thermal energy transferred, watts/loop | 823 |
| Vapor temperature during operation, °F. | 94.69 |

The efficiency was calculated by means of the equation used in Example 4. If the air flows on both sides of the exchanger were each 250 ft./min., the efficiency would have been 60.15%. Heat transferred was calculated by the equation, $Q = $ (Air rate) (Heat exchanger face area) (60 min. per hr.) (Air density at room temp.) (Air specific heat at room temp.) (Temp. difference)

For the fresh air supply side of the exchanger:

-continued $$Q_s = 250 \text{ ft./min.} \times 9.05 \text{ sq. ft.} \times 60 \text{ min./hr.} \times 0.0749$$
$$\text{lbs./cu. ft.} \times 0.2405 \text{ BTU/lb. °F.} \times (109.47 - 26.67)$$
$$= 202{,}472.98 \text{ BTU/hr.}$$

For the exhaust air side of the exchanger:
$$Q_{cx} = 310 \times 9.05 \times 60 \times 0.0749 \times 0.2405 \times (154.9 - 87.7)$$
$$= 203{,}764.11 \text{ BTU/hr.}$$

The difference between the two sides is within the limits of experimental error, and note that no density correction was made for the warmer exhaust air. The thermal energy transport per loop is given by the average heat transfer per hour divided by the number of loops, followed by an appropriate conversion, or 203,118/72, which equals 2819 BTU/loop hr., and since 3413 BTU/hr. is equal to 1 Kw., the thermal energy is 2819/3413 or 0.823 Kw/loop or 823 watts/loop.

It will be appreciated, and is thought to be evident, that the transport of "thermal energy", or "heat", or "power", refers to the same quantity expressed in different units. Also, a reference to air from "outside" means the out-of-doors, or outdoors, or open, or wide open spaces, or atmosphere. Incoming and exhaust air flows are usually counter to each other but could be in the same direction where necessary. Although an illustrative curvature is shown for the end pieces or bends of the loops, varying degrees of curvature are possible, even to the extent of having 90° angles, or near 90° angles, between an end piece and the two arms of a loop. Upper and lower arms of a loop are preferably parallel, but a slight departure from such condition is permissible. Also, it will be understood that tubes of noncircular cross section, if and when available, may be used to form the loops.

In equation (1) above, the term S is defined as the distance between near adjacent surfaces of the loop arms, and as seen in FIG. 1, the "adjacent surfaces" involved are the two nearest surfaces; alternatively, the distance may be defined as extending between the longitudinal center lines of the upper and lower arms, and if this second distance is denoted S', it is equal to S plus 2R, where R is the arm radius, or S' = S plus D.

It will be understood that the invention is capable of obvious variations without departing from its scope.

In the light of the foregoing description, the following is claimed:

1. In a bidirectional heat exchanger device for adjusting the air temperature in a first space by adding thereto air at a different temperature from a second space, wherein a first airway and a second airway are present for transferring air therethrough, means for keeping said airways separate, wherein working agent-containing heat exchange elements extend into and between said airways for transporting heat from the air in one airway to that in another, said elements each comprising an evaporator portion in one airway for receiving heat from heated air passing thereover and a condenser portion in the other airway for giving up heat to air passing thereover, and wherein said elements have a horizontal orientation which is difficult to establish and/or maintain and is subject to change during construction, installation, and/or operation of the device to produce unavoidable, accidental, and/or initially undetected adverse tilts, said adverse tilts being characterized by having said evaporator disposed above the level of the condenser and being of a magnitude as to reduce or even shut off the heat transport capability of the device, the improvement wherein each element is a tube in the form of a closed, substantially horizontally disposed, evacuated, hermetically sealed loop comprising a pair of arms connected to each other at their ends by a pair of end members, one arm being disposed above the other such that a plane passing through longitudinal center lines of both arms makes an angle with the horizontal which is in the range of 15° to 165°, and said arms of each loop being spaced apart a distance of 1 to 25 arm diameters, said working agent initially being disposed only in the lower of said arms of a loop and being present in the range of 34% to 51.3% of the loop internal volume, said agent being vaporizable in the lower loop arms of the evaporator with resulting vapors flowing upwardly through adjacent end members of the evaporator to the upper arms and then along said upper arms to said condenser where they are condensed and the condensed agent then flowing down the end members adjacent thereto to the lower loop arms of the condenser and back to the evaporator, said agent in the form of vapor and condensate flowing cocurrently through said loops in the same direction, each said loop having a liquid driving head for effecting heat transport which is in the range of 2.5 to 27 times the diameter of a loop arm and which is in the range of 2.5 to 27 times greater than the driving head of a conventional Perkins tube element, the diameters of the Perkins tube and the loop tube being the same, said liquid driving head being reinforced by the action of the vapor flow which is cocurrent with the liquid flow, thereby to produce a combined driving head that is additionally greater than that of said Perkins tube which has a countercurrent vapor/liquid flow in which vapor shear reduces the liquid head by acting against the same, each said loop in heat exchange operation being characterized by (1) transporting a substantially greater amount of thermal energy than a conventional Perkins tube under comparable conditions, by (2) transporting said greater amount of thermal energy, without burnout, at an adverse tilt of about 1 inch, thus exhibiting insensitivity to said tilt, whereas said Perkins tube under comparable conditions exhibits burnout at a substantially lower adverse tilt and at a substantially lower thermal energy transport level, and by (3) transporting more than twice the power, without burnout, than a conventional Perkins tube under comparable conditions, said device being free of tilt-producing and/or tilt-changing mechanism while coincidently exhibiting an efficiency which is substantially insensitive to an adverse tilt of one inch and which is greater than 50% in the presence of an adverse tilt of 1 to 2 inches, and said device, throughout bidirectional operation of the same, and by virtue of said insensitivity to adverse tilts, being rigidly attachable in place and to said airways, said attachment aiding the passive operational quality of the device.

2. Heat exchange device of claim 1 in which two agents are present in each loop, one having a lower boiling point than the other, in order to secure boiling at a lower temperature, thereby to reduce subcooling of liquid agent and to promote heat transfer by boiling over heat transfer by conduction.

3. Heat exchange device of claim 1 in which agent vapors may be present in the upper loop arm of the evaporator which are at a temperature above the critical temperature of the agent without rendering the device inoperative.

* * * * *

UNITED STATES PATENT OFFICE
CERTIFICATE OF CORRECTION

Patent No. 4,222,436          Dated Sep. 16, 1980

Inventor(s) Milton F. Pravda

It is certified that error appears in the above-identified patent and that said Letters Patent are hereby corrected as shown below:

col. 2, line 15, "which" should be --each-- col. 6, line 54, "0.00001" should be --0.0001-- col. 8, line 34, "of" should be --or-- col. 8, line 48, "Example" should be --Examples-- col. 9, line 13, "and" should be --had-- col. 9, line 21, "Leakproff" should be --Leakproof-- col. 15, lines 31/32, " x 100 " has been omitted and should appear to the right of the division line col. 15, line 61, "2,788,388" should be --3,788,388-- col. 16, line 49, "64.57" has been omitted. It should be added opposite "side of exchanger, °"

Signed and Sealed this

Twenty-fifth Day of November 1980

[SEAL]

*Attest:*

SIDNEY A. DIAMOND

*Attesting Officer*          *Commissioner of Patents and Trademarks*